United States Patent
Benzing et al.

[11] Patent Number: 5,965,222
[45] Date of Patent: Oct. 12, 1999

[54] PROCESS FOR MANUFACTURING A TRIM AND THE TRIM ITSELF

[75] Inventors: Thomas Benzing, Wildberg; Juergen Guenter, Sindelfingen; Jaroslav Hejtmanek, Moetzingen; Luise Schellhorn, Sindelfingen, all of Germany

[73] Assignee: DaimlerChrysler AG, Stuttgart, Germany

[21] Appl. No.: 08/892,390

[22] Filed: Jul. 14, 1997

[30] Foreign Application Priority Data

Jul. 12, 1996 [DE] Germany ............... 196 28 109

[51] Int. Cl.⁶ ............... B60R 13/00; B32B 31/00
[52] U.S. Cl. ............... 428/31; 428/172; 428/201; 428/204; 428/207; 156/154; 156/242; 156/244.15; 156/245.25
[58] Field of Search ............... 428/156, 172, 428/31, 99, 168, 201, 204, 207, 542.2; 156/6, 207, 153, 154, 244, 244.15, 245.25; 264/162, 241, 299; 296/41, 191

[56] References Cited

U.S. PATENT DOCUMENTS

| | | | |
|---|---|---|---|
| 4,443,392 | 4/1984 | Becker et al. | 264/25 |
| 4,781,956 | 11/1988 | Zimmerman et al. | 428/43 |
| 5,429,857 | 7/1995 | Amemya et al. | 428/156 |

FOREIGN PATENT DOCUMENTS

| | | |
|---|---|---|
| 0453382A1 | 10/1991 | European Pat. Off. . |
| 2218183 | 11/1972 | Germany . |
| 3406521A1 | 8/1985 | Germany . |
| 4141955A1 | 7/1992 | Germany . |
| 4222306C1 | 5/1993 | Germany . |

OTHER PUBLICATIONS

Search Report Nov. 7, 1997 Europe.

*Primary Examiner*—Donald Loney
*Attorney, Agent, or Firm*—Evenson McKeown Edwards & Lenahan PLLC

[57] ABSTRACT

A basic part is produced which has a three-dimensionally structured surface; then the surface of the basic part is covered by means of a resin layer in such a manner that all elevations of the three-dimensionally structured surface are covered; subsequently, the resin layer is ground off to such an extent that the tips of the elevations of the surface are also partially ground; and finally at least the ground-off surface is sealed by means of a clear coating.

22 Claims, 1 Drawing Sheet

PROCESS FOR MANUFACTURING A TRIM AND THE TRIM ITSELF

BACKGROUND AND SUMMARY OF THE INVENTION

This application claims the priority of German Application No. 196 28 109.1, filed in Germany on Jul. 12, 1996, the disclosure of which is expressly incorporated by reference herein.

The invention relates to a process for manufacturing a trim for an interior fitting arrangement of a motor vehicle which has an aesthetically designed surface as well as to a trim manufactured according to this process.

From German Patent Document DE 41 41 955 A1, an interior fitting part for a motor vehicle is known whose surface is provided with a transparent matrix with exotic fibers. The basic material is a fiber glass substrate. The transparent matrix is provided with woven fibers which supply an iridescent coloring. A clear coating is used as the protective layer.

It is an object of the invention to provide a process as well as a trim of the initially mentioned type by means of which the appearance of the interior fitting arrangement is improved in a simple manner.

This object is achieved in that the surface of the basic part is coated with a resin layer in such a manner that all elevations of the three-dimensionally structured surface are covered, in that subsequently the resin layer is ground off to such an extent that the tips of the elevations of the surface are also partially ground, and in that finally at least the ground off surface is sealed with a transparent coating.

By means of the solution according to the invention, it is possible to achieve new aesthetic effects in the case of trims in that the partially ground structures of the basic part are embedded in a tarsia-like manner under the resin layer. The trim has a very simple design and can be manufactured without high-expenditure devices and tools. The process according to the invention is suitable particularly for the interior fitting arrangement of motor vehicle prototypes because individual constructions can be manufactured rapidly and easily for a stylistic evaluation or low piece numbers can be manufactured for special series. The basic part is made of such a material that a splintering is prevented in the case of a motor vehicle crash and thus a sufficient safety for the occupants is ensured. If the process according to the invention is used for manufacturing large piece numbers, the individual process steps are preferably carried out by correspondingly automated machines and tools.

According to certain preferred embodiments of the invention, the ground-off surface is polished before the clear coating is applied. As a result, an improved surface finish is achieved whereby the optical effect of the trim is also improved.

In a further development of preferred embodiments of the invention, the resin layer is at least partially dyed before it is applied to the surface of the basic part. This permits the achieving of an improved appearance. It is possible in this case to dye the resin only in a locally limited manner or provide it with special pigments which give the resin layer special visual effects, such as a pearly luster, metallic effects or polychromatic effects.

As a further development of preferred embodiments of the invention, the basic part is manufactured as a metallic diecast part, particularly as an aluminum diecast part, in one piece. This ensures a fast and simple manufacturing of the basic part. When corresponding ductile metallic alloys are used, a splintering of the basic part in the case of a vehicle crash which could endanger the occupants is avoided.

As a further development of preferred embodiments of the invention, the basic part is provided which fastening elements which are molded-on in one piece. The trim can therefore be inserted directly into corresponding fastening points of the interior fitting arrangement without the requirement of additional fastening elements.

Other objects, advantages and novel features of the present invention will become apparent from the following detailed description of the invention when considered in conjunction with the accompanying drawings.

DETAILED DESCRIPTION OF THE DRAWINGS

Figure 1:
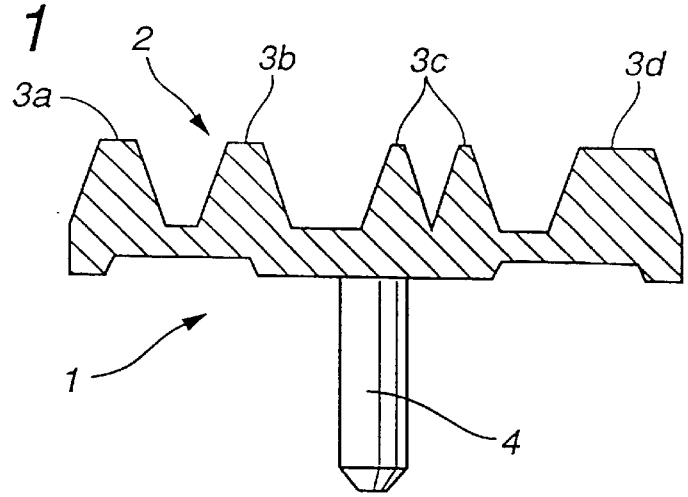
FIG. 1 is a cross-sectional view of a basic part of a trim constructed according to a preferred embodiment of the invention.
Figure 2:
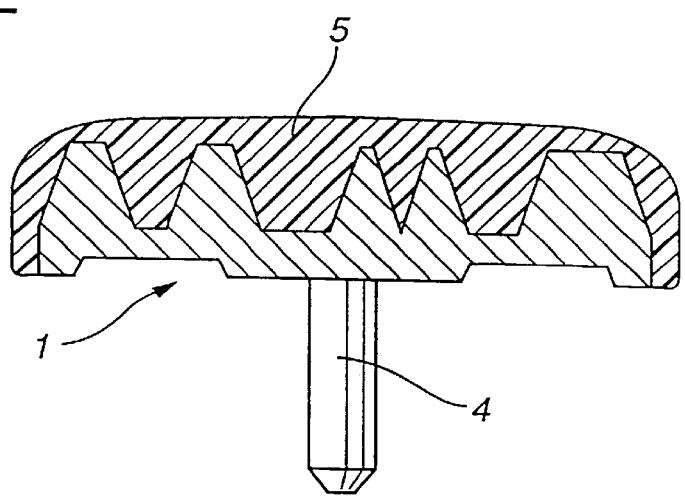
FIG. 2 is a sectional view of the basic part according to FIG. 1 to which a resin layer is applied in a second process step.
Figure 3:
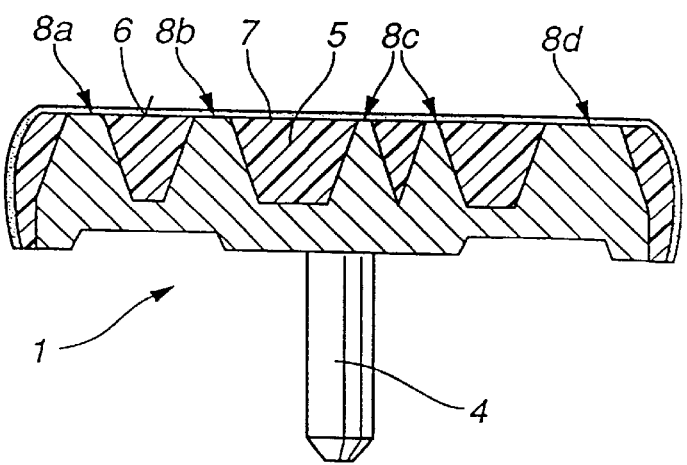
FIG. 3 is a cross-sectional view according to FIG. 1 and 2 of the finished trim.

A basic part 1 illustrated as a cross-section in FIG. 1 is represented by a plate-type element which is provided with a three-dimensionally structured surface 2. The basic part 1 is manufactured in one piece as a diecast aluminum part and, on its rearward side, has at least one fastening element 4 which is molded in one piece to the basic part 1. The surface 2 of the basic part 1 is provided with elevations 3a, 3b, 3c, 3d which have conically tapering cross-sections and which are distributed in a mutually spaced manner along the surface 2. Between the individual elevations 3a, 3b, 3c, 3d, indentations are formed which are not shown in detail. The basic part 1, which serves as a basic body 1, is manufactured by means of an aluminum diecasting process which is known per se, such an aluminum diecasting process being suitable for the manufacturing of larger piece numbers.

In the case of an embodiment of the invention which is not shown, the basic part is manufactured essentially manually. This manufacturing method, which will be described in detail in the following, is particularly suitable for small piece numbers, particularly for prototype constructions or special series. In this case, a graphic design drawn by hand or by means of a computer is first transferred to a model in the case of which the elevations are shown over a base plate which roughly has the form of the future trim. A negative cast made of silicone is produced of this model, by means of which negative cast its sample is cast from low-melting metal alloys. The sample blank is removed from the mold and trimmed. Subsequently, this sample is cast in the front casting method with a dyed reaction resin to such an extent that the elevations of the three-dimensionally structured surface are completely embedded in the resin. After the hardening of the resin, the surface of the resin layer is partially ground to such an extent that the tips of the elevations of the three-dimensionally structured surface break through the resin surface and are partially ground together with the resin surface. The desired surface quality is achieved by means of a corresponding polishing.

In the case of the illustrated embodiment, a resin layer 5 which is dyed is applied to the basic part 1 in the area of the three-dimensionally structured surface 2 by means of injection or spraying techniques. The resin layer 5 is applied to the surface 2 in such a thick manner that the three-dimensionally structured surface 2 including the elevations 3a, 3b, 3c, 3d is completely embedded in the resin layer 5. After the hardening of the resin layer, the trim combined of resin and the basic part 1 has a certain overdimension in its height and its width. Subsequently, the surface of the resin layer 5 is ground off flatly to such an extent that the tips 8a, 8b, 8c, 8d of the elevations 3a, 3b, 3c, 3d break through the ground surface 6 of the resin layer 5 and are also partially ground in a correspondingly flat manner. With this ground-off surface 6, the trim, including the basic part 1 and the resin layer 5, has reached its final form. By means of the partial grinding of the elevations 3a, 3b, 3c, 3d, which are embedded in the resin layer 5, a tarsia-like effect is achieved, the special design of the effect being obtainable by a suitable selection of the three-dimensionally structured surface 2. A protective coating of a clear lacquer sealing 7 is applied to the finished trim. The finished trim can be used in arbitrary areas of the interior fitting arrangement of a motor vehicle and replaces in particular wood-veneered trims known per se in the door or dashboard area.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for manufacturing a trim for an interior fitting arrangement of a motor vehicle, having a basic part with a three-dimensionally structured surface for an interior fitting arrangement of a motor vehicle, comprising:

covering the surface of the basic part with a resin layer in such a manner that all elevations of the three-dimensionally structured surface are covered, subsequently grinding off the resin layer to such an extent that tips of elevations of the surface are also partially ground off to form a ground off surface, and sealing at least the ground-off surface by applying a clear coating.

2. Process according to claim 1, comprising polishing the ground-off surface before the clear coating is applied.

3. Process according to claim 1, comprising at least partially dyeing the resin layer before covering the surface of the basic part with the resin layer.

4. Process according to claim 2, comprising at least partially dyeing the resin layer before covering the surface of the basic part with the resin layer.

5. Process according to claim 1, wherein the basic part is manufactured in one piece as a metallic diecast aluminum part.

6. Process according to claim 2, wherein the basic part is manufactured in one piece as a metallic diecast aluminum part.

7. Process according to claim 3, wherein the basic part is manufactured in one piece as a metallic diecast aluminum part.

8. Process according to claim 5, wherein the basic part is provided with at least one fastening element molded on in one piece.

9. Process according to claim 6, wherein the basic part is provided with at least one fastening element molded on in one piece.

10. Process according to claim 7, wherein the basic part is provided with at least one fastening element molded on in one piece.

11. Trim for an interior fitting arrangement of a motor vehicle, comprising:

a basic part with a three dimensionally structured surface, a resin layer applied to the basic part to cover all elevations of the structured surface, said resin layer being ground off to such an extent that tips of elevations of the structured surface are also partially ground off, and a clear coating applied to the ground off surface to seal the trim.

12. Trim according to claim 11, wherein the ground off surface is polished to form a polished ground off surface covered by the clear coating.

13. Trim according to claim 11, wherein the resin layer is at least partially dyed.

14. Trim according to claim 12, wherein the ground off surface is polished to form a polished ground off surface covered by the clear coating.

15. Trim according to claim 11, wherein the basic part is manufactured in one piece as a metallic diecast aluminum part.

16. Trim according to claim 12, wherein the basic part is manufactured in one piece as a metallic diecast aluminum part.

17. Trim according to claim 13, wherein the basic part is manufactured in one piece as a metallic diecast aluminum part.

18. Trim according to claim 14, wherein the basic part is manufactured in one piece as a metallic diecast aluminum part.

19. Trim according to claim 15, wherein the basic part is provided with at least one fastening element molded on in one piece.

20. Trim according to claim 16, wherein the basic part is provided with at least one fastening element molded on in one piece.

21. Trim according to claim 17, wherein the basic part is provided with at least one fastening element molded on in one piece.

22. Trim according to claim 18, wherein the basic part is provided with at least one fastening element molded on in one piece.

* * * * *